United States Patent
Choi (10) Patent No.: US 12,076,835 B2
(45) Date of Patent: Sep. 3, 2024

(54) AIR CIRCULATION SYSTEM AND FINAL POLISHING APPARATUS INCLUDING THE SAME

(71) Applicant: SK Siltron Co., LTD., Gyeongsangbuk-do (KR)

(72) Inventor: Yong Choi, Seoul (KR)

(73) Assignee: SK SILTRON CO., LTD., Gyeongsangbuk-Do (KR)

( * ) Notice: Subject to any disclaimer, the term of this patent is extended or adjusted under 35 U.S.C. 154(b) by 432 days.

(21) Appl. No.: 17/483,943

(22) Filed: Sep. 24, 2021

(65) Prior Publication Data

US 2022/0219288 A1    Jul. 14, 2022

(30) Foreign Application Priority Data

Jan. 14, 2021    (KR) .......... 10-2021-0005178

(51) Int. Cl.
| | |
|---|---|
| *B24B 55/06* | (2006.01) |
| *B01D 46/00* | (2022.01) |
| *B01D 46/58* | (2022.01) |
| *B01D 53/26* | (2006.01) |

(52) U.S. Cl.
CPC .......... *B24B 55/06* (2013.01); *B01D 46/0027* (2013.01); *B01D 46/58* (2022.01); *B01D 53/265* (2013.01); *B01D 2279/35* (2013.01)

(58) Field of Classification Search
CPC ....... B24B 55/06; B24B 55/12; B24B 37/015; B24B 37/34; B01D 46/58; B01D 46/0027; B01D 53/265; B01D 2279/35
USPC ................. 451/449, 453, 456, 488
See application file for complete search history.

(56) References Cited

U.S. PATENT DOCUMENTS

| | | | | |
|---|---|---|---|---|
| 6,293,855 B1 * | 9/2001 | Yoshida | ............ | H01L 21/67219 |
| | | | | 451/287 |
| 2004/0198052 A1 * | 10/2004 | Togawa | .................. | B24B 41/00 |
| | | | | 438/689 |

FOREIGN PATENT DOCUMENTS

| | | |
|---|---|---|
| JP | H07-223142 | 8/1995 |
| JP | H10-103714 | 4/1998 |
| JP | H10-340872 | 12/1998 |
| JP | 2000-040648 | 2/2000 |
| JP | 2000-091399 | 3/2000 |
| JP | 2004-176978 | 6/2004 |

(Continued)

OTHER PUBLICATIONS

Korean Office Action dated Sep. 13, 2022 issued in Application No. 10-2021-0005178.

(Continued)

*Primary Examiner* — Brian D Keller
*Assistant Examiner* — Alberto Saenz
(74) *Attorney, Agent, or Firm* — KED & ASSOCIATES, LLP (57) ABSTRACT

Disclosed are an air circulation system and a final polishing apparatus including the same. The air circulation system improves the degree of contamination in a final polishing apparatus including a housing formed to accommodate a load unit, an unload unit, and a plurality of polishing units. The air circulation system includes air purification units mounted at positions corresponding to the positions of the load unit, the unload unit, and the plurality of polishing units. The air purification units discharge contaminated air in the housing to the outside of the housing, purify the discharged air, and supply the purified air again into the housing.

10 Claims, 7 Drawing Sheets

(56) References Cited

FOREIGN PATENT DOCUMENTS

| | | |
|---|---|---|
| JP | 2005-214602 | 8/2005 |
| JP | 2007-301442 | 11/2007 |
| JP | 2014-515468 | 6/2014 |
| KR | 10-2017-0076242 | 7/2017 |
| KR | 10-2017-0119125 | 10/2017 |
| KR | 10-2018-0080800 | 7/2018 |
| KR | 10-2020-0129110 | 11/2020 |

OTHER PUBLICATIONS

Japanese Office Action dated Sep. 9, 2022 issued in Application No. 2021-152842.
Korean Notice of Allowance dated Mar. 10, 2023 issued in Application No. 10-2021-0005178.

* cited by examiner

AIR CIRCULATION SYSTEM AND FINAL POLISHING APPARATUS INCLUDING THE SAME

This application claims the benefit of Korean Patent Application No. 10-2021-0005178, filed on Jan. 14, 2021, which is hereby incorporated by reference as if fully set forth herein.

BACKGROUND OF THE INVENTION

Field of the Invention

The present invention relates to an air circulation system and a final polishing apparatus including the same, and more particularly to an air circulation system capable of purifying air in a final polishing apparatus by itself, of circulating the purified air to solve a problem of stagnation of airflow in equipment, and of preventing the occurrence of minute defects due to contaminants such as polishing dust, and to a final polishing apparatus including the same.

Discussion of the Related Art

Figure 1:
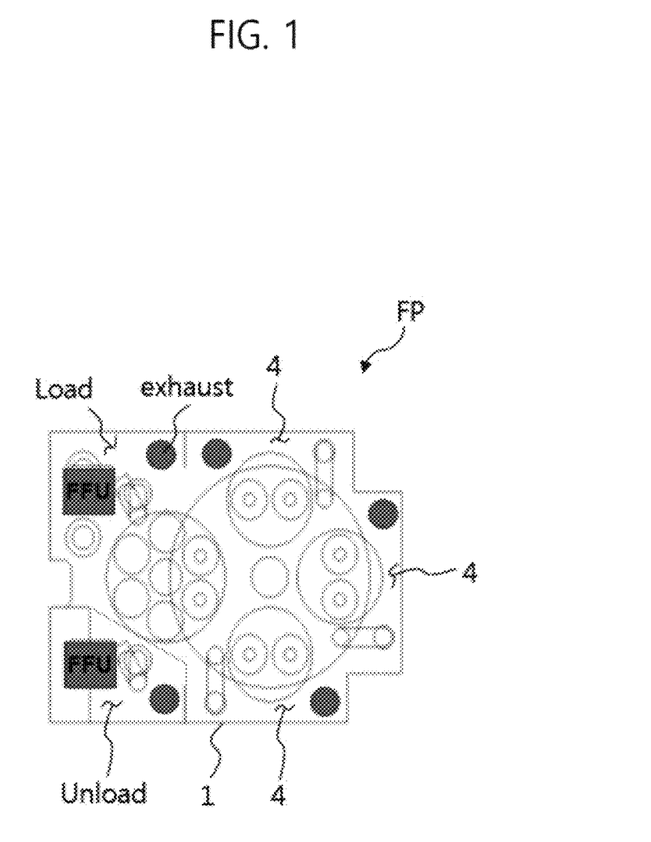
FIG. 1 is a conceptual view showing the positions of fan filter units and exhaust units in a conventional final polishing apparatus.
Figure 2:
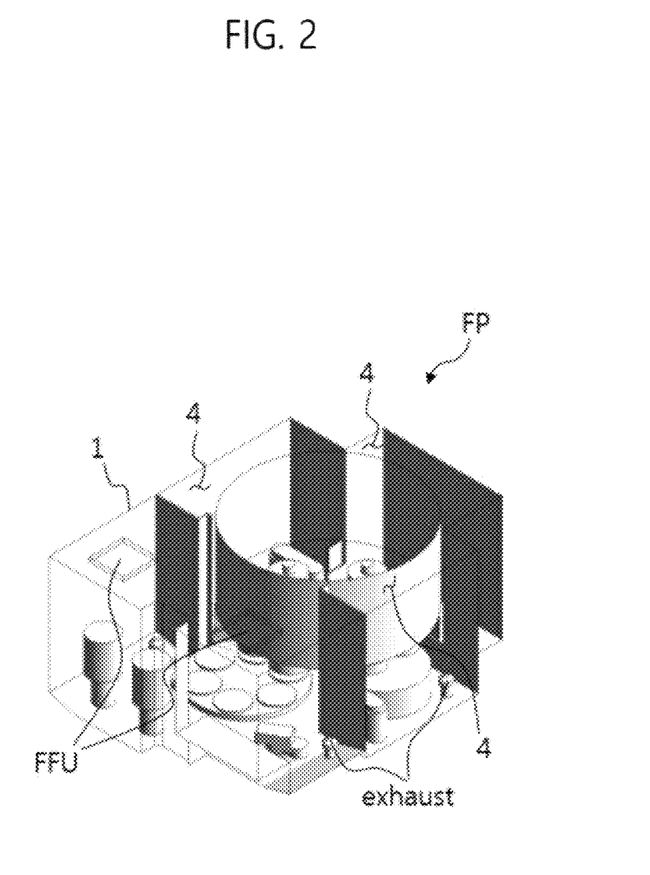
FIG. 2 is a three-dimensional view of FIG. 1.

FIG. 1 is a conceptual view showing the positions of fan filter units FFU and exhaust units in a conventional final polishing apparatus FP, and FIG. 2 is a three-dimensional view of FIG. 1.

Referring to FIGS. 1 and 2, in the case of a process of polishing a wafer, polishing dust is generated during polishing, and the generated polishing dust circulates in a final polishing apparatus FP. An exhaust unit, which is mounted at a lower portion of equipment, is constantly operated in order to remove the polishing dust. However, in the case in which air does not smoothly circulate in the final polishing apparatus FP, the polishing dust generated during polishing is re-adsorbed to the surface of the wafer, thus leading to the formation of minute defects on the surface of the wafer. Therefore, there is the need to secure smooth circulation of air in the final polishing apparatus FP.

An airflow state in the final polishing apparatus FP will be described below with reference to FIGS. 1 and 2.
1. In the case of load and unload units, clean air is introduced thereinto from above through fan filter units FFU.
2. The air in the equipment is discharged to the outside through exhaust units formed in a lower portion of the final polishing apparatus FP.

However, because the fan filter units FFU, which function to blow clean air, are provided only at the load unit and the unload unit, there is a problem in that air does not smoothly circulate in a polishing unit 4, in which wafers are substantially polished. Further, the fan filter units FFU are mounted only at one side of the equipment, thus incurring a problem in which stagnation and disturbance of airflow occur in the polishing unit.

Further, one main exhaust unit is connected to the equipment, and branches into five units in the equipment. Furthermore, the main exhaust unit of the factory diverges so as to be connected to several final polishing apparatuses. However, this conventional exhaust structure has a problem in that the exhaust pressure is low, and thus the exhaust units become clogged with polishing dust.

RELATED ART DOCUMENTS

Patent Documents (Patent Document 0001) Korean Patent Laid-Open Publication No. 10-2017-0076242

(Patent Document 0002) Korean Patent Laid-Open Publication No. 10-2018-0080800

SUMMARY OF THE INVENTION

Accordingly, the present invention is directed to an air circulation system and a final polishing apparatus including the same that substantially obviate one or more problems due to limitations and disadvantages of the related art.

An object of the present invention is to provide an air circulation system and a final polishing apparatus including the same, in which fan filter units are mounted to respective polishing units as well as a load unit and an unload unit, exhaust units are mounted to a lower portion of equipment at positions corresponding to the positions of the fan filter units, and air discharged from the equipment is purified and circulated such that the purified air is supplied into the equipment, whereby stagnation of airflow and minute defects attributable to polishing dust, which occur in the related art, may be effectively prevented.

However, the objects to be accomplished by the present invention are not limited to the above-mentioned objects, and other objects not mentioned herein will be clearly understood by those skilled in the art from the following description.

In order to accomplish the above and other objects, an air circulation system according to an embodiment of the present invention may improve the degree of contamination in a final polishing apparatus including a housing formed to accommodate a load unit, an unload unit, and a plurality of polishing units, and may include air purification units mounted at positions corresponding to the positions of the load unit, the unload unit, and the plurality of polishing units, the air purification units being configured to discharge contaminated air in the housing to the outside of the housing, to purify the discharged air, and to supply the purified air again into the housing.

The air purification units may operate independently.

Each of the air purification units may discharge and supply air through a duct extending from a lower portion of a side surface of the housing to an upper portion of the housing, and may include an air exhaust unit configured to discharge air in the housing to the outside of the housing, a dehumidification unit disposed at a front side of the air exhaust unit in order to remove moisture contained in air discharged from the housing, a temperature adjustment unit configured to adjust the temperature of air dehumidified by the dehumidification unit to a set temperature, a filter unit configured to remove polishing dust from air, the temperature of which has been adjusted to the set temperature by the temperature adjustment unit, and an air supply unit configured to supply air filtered by the filter unit into the housing.

The air exhaust unit may be mounted at a front side of the duct formed to allow air to move therethrough, and may include at least one exhaust fan and a cover configured to prevent slurry, generated during a polishing process, from moving directly to the at least one exhaust fan.

The dehumidification unit may be mounted at a front side of the at least one exhaust fan, and may include an evaporator, a compressor, and a condenser.

The temperature adjustment unit may include a frame, supported by the inner surface of the duct in the state of being in contact therewith, and dry coils, provided inside the frame so as to be spaced apart from each other at regular intervals to allow the dehumidified air to pass through the spaces therebetween, the dry coils being formed such that the temperature thereof is adjusted to a set temperature.

The filter unit may include at least one filter mounted in the duct in a moving direction of dried air.

Alternatively, the filter unit may include at least one filter detachably mounted in the duct, formed in a vertical direction, in a moving direction of dried air, and a dust collector provided under the duct, in which the at least one filter is mounted, in order to collect polishing dust removed by the at least one filter.

The air supply unit may be mounted at a rear side of the duct formed to allow air to move therethrough, and may include at least one supply fan configured to supply air containing no polishing dust to the inner lower portion of the housing from the upper portion of the housing.

The air supply unit may further include at least one filter disposed at a front side of the at least one supply fan in order to again filter air to be supplied into the housing.

In addition, there is provided a final polishing apparatus including the air circulation system having the above-described characteristics.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, embodiments of the present invention will be described in detail with reference to the accompanying drawings.

In the drawings, elements may be exaggerated in size, omitted, or illustrated schematically for convenience in description and clarity. Further, the sizes of elements do not indicate the actual sizes of the elements. Wherever possible, the same reference numerals will be used throughout the drawings to refer to the same parts.

Figure 3:
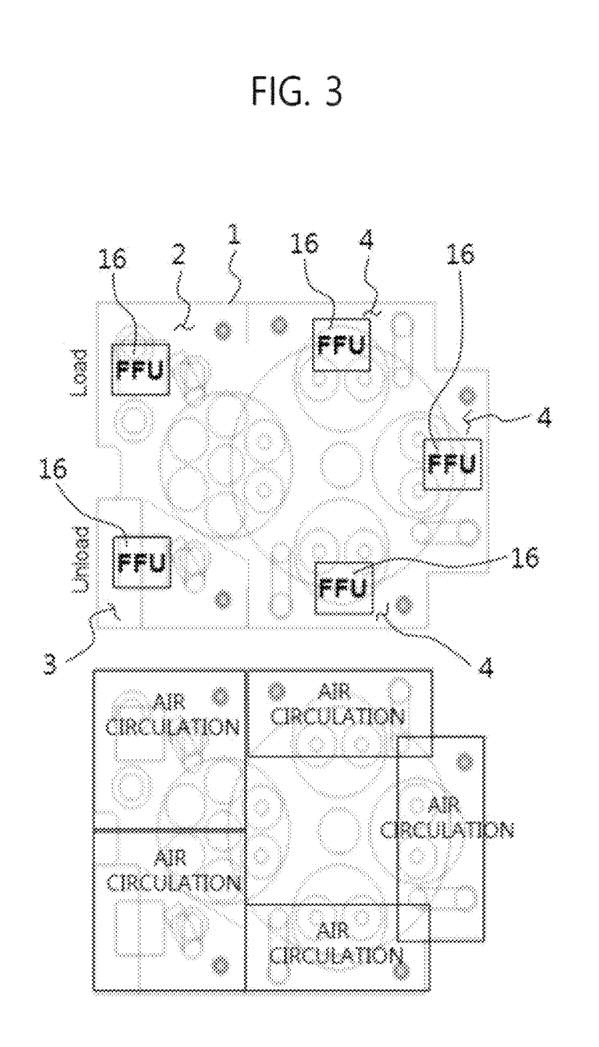
FIG. 3 is a conceptual view showing the configuration associated with air circulation in an air circulation system according to the present invention.
Figure 4:
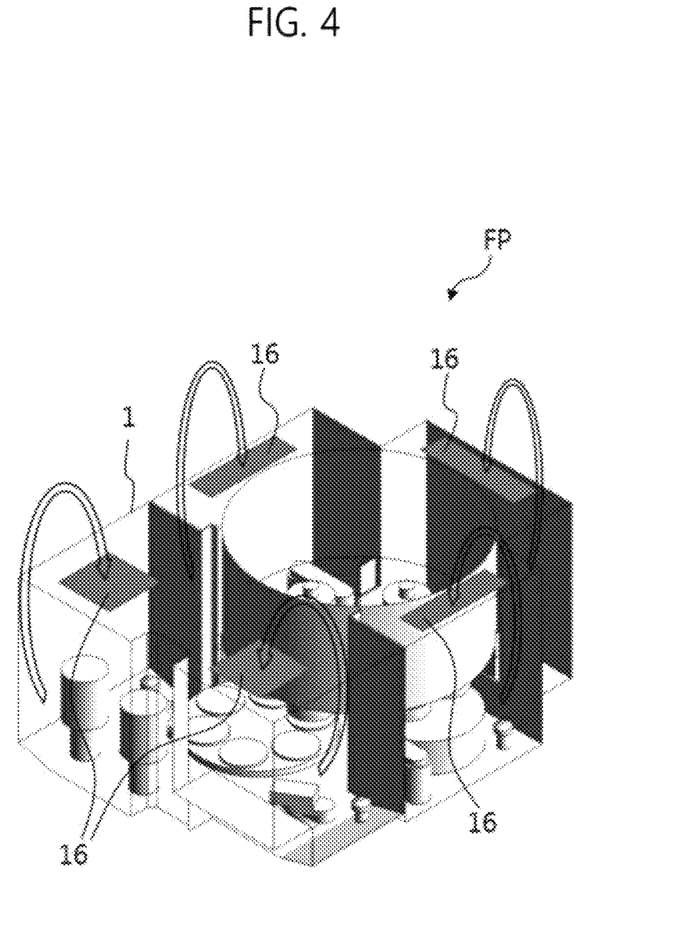
FIG. 4 is a three-dimensional view of FIG. 3.

FIG. 3 is a conceptual view showing the configuration associated with air circulation in an air circulation system according to the present invention, and FIG. 4 is a three-dimensional view of FIG. 3.

First, the air circulation structure of an air circulation system according to the present invention will be described with reference to FIGS. 3 and 4.

An air circulation system of the present invention is proposed to improve the degree of contamination in a final polishing apparatus FP, which includes a housing 1 in which a load unit 2, an unload unit 3, and a plurality of polishing units 4 are mounted. The air circulation system of the present invention includes air purification units, which are mounted at a total of five points, including the load unit 2, the unload unit 3, and the polishing units 4 (three polishing units are illustrated in the drawings). The air purification units have an air circulation structure of discharging contaminated air in the housing 1, i.e. in the final polishing apparatus FP, to the outside to purify the same and of supplying the purified air again into the final polishing apparatus FP. In other words, the filtered air is introduced from above into the load unit 2, the unload unit 3, and the three polishing units 4. The air introduced into the inner upper portion of the housing 1 is moved to the inner lower portion of the housing 1. At this time, polishing dust, which is generated during polishing, is contained in the air moved to the lower portion of the housing 1. The contaminated air containing polishing dust is discharged to the outside from the inner lower portion of the housing 1. The discharged air is filtered and is again introduced into the housing 1 from above, with contaminants such as polishing dust removed therefrom.

The air purification units operate independently, rather than being connected to one main exhaust unit or supply unit, unlike the conventional art. Accordingly, the air purification units may always operate in the state in which the supply pressure and the exhaust pressure are maintained constant. In addition, the supply pressure and the exhaust pressure may be adjusted in consideration of the extent of defects of wafers due to polishing dust that is generated during the process of polishing the wafers.

Figure 5:
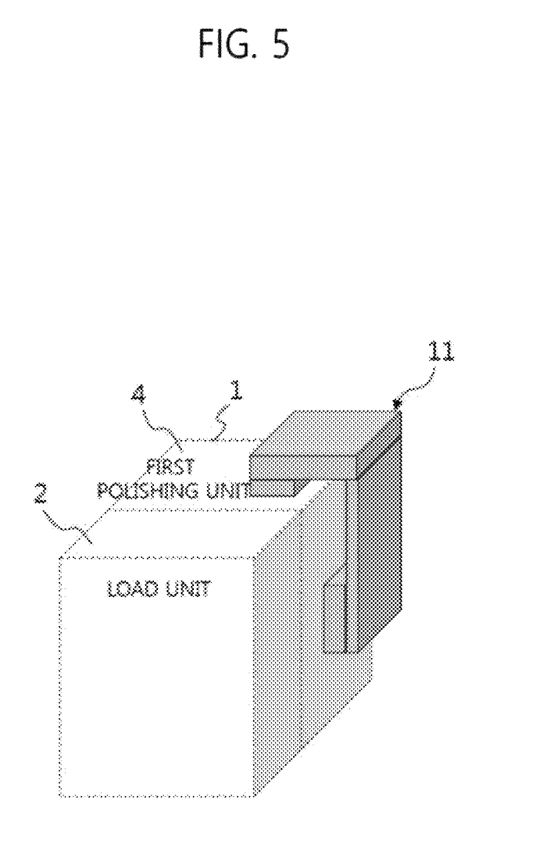
FIG. 5 is a conceptual view showing the configuration of an air purification unit according to the present invention.
Figure 6:
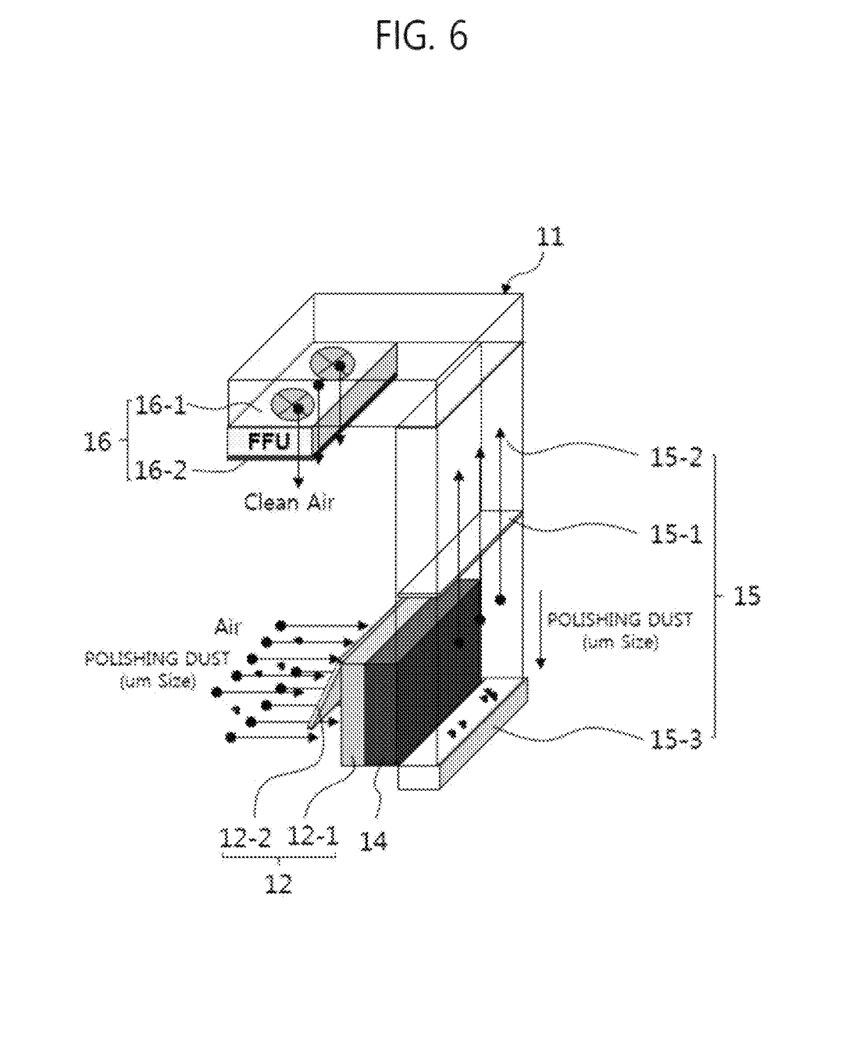
FIG. 6 is a mimetic diagram of the air purification unit shown in FIG. 5.
Figure 7:
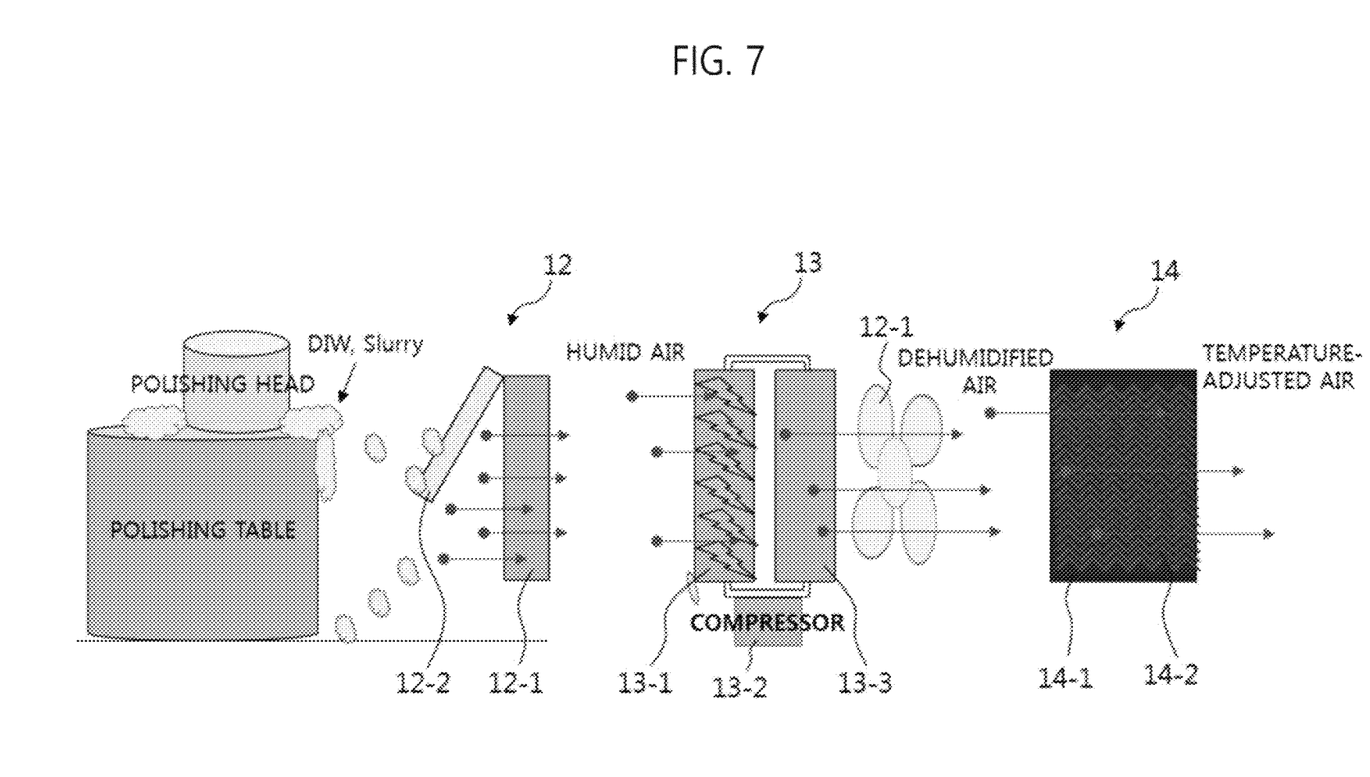
FIG. 7 is a conceptual view showing the concrete configurations of an air exhaust unit, a dehumidification unit, and a temperature adjustment unit according to the present invention.

FIG. 5 is a conceptual view showing the configuration of the air purification unit according to the present invention, FIG. 6 is a mimetic diagram of the air purification unit shown in FIG. 5, and FIG. 7 is a conceptual view showing the concrete configurations of an air exhaust unit 12, a dehumidification unit 13, and a temperature adjustment unit 14 according to the present invention.

The concrete configuration of the air purification unit according to the present invention will be described below with reference to FIGS. 5 to 7.

The air purification unit according to the present invention includes a duct 11, an air exhaust unit 12, a dehumidification unit 13, a temperature adjustment unit 14, a filter unit 15, and an air supply unit 16. The air purification unit discharges the air in the housing 1 to the outside of the housing 1 through the duct 11, which extends from the lower portion of the side surface of the housing 1 to the upper portion of the housing 1, purifies the discharged air, and again supplies the purified air into the housing 1.

Referring to FIG. 5, the duct 11 forms the overall external framework of the air purification unit. As shown in FIG. 4, the air purification unit filters the air in the housing 1 and circulates the filtered air. FIG. 5 illustrates the duct 11 provided at a first polishing unit 4, among the three polishing units 4. Although it is illustrated in FIG. 5 that the duct 11 is connected to the upper portion of the housing 1 and to the middle portion of the housing 1, it can be understood that the duct 11 is connected to the inner lower portion of the housing 1, rather than the middle portion of the housing 1. The duct 11 forms an airflow passage through which the air discharged from the inside of the housing 1 is moved and again introduced into the housing 1. Although the air exhaust unit 12, the filter unit 15, and the air supply unit 16 are illustrated in the drawings as being provided separately in order to be distinguished from each other, these components may be integrally formed in the duct 11. Further, the shape of the duct 11 is not limited to the shape illustrated in the drawings, so long as the same is capable of providing an airflow passage. The duct 11 is located outside the housing 1, and is provided at each of the load unit 2, the unload unit 3, and the three polishing units 4 so as to be connected to the lower portion and the upper portion of each of these components. The air exhaust unit 12, the dehumidification unit 13, the temperature adjustment unit 14, the filter unit 15, and the air supply unit 16 may be mounted in the duct 11.

The air exhaust unit 12 discharges the air in the housing 1 to the outside of the housing 1 through the duct 11. The air exhaust unit 12 includes at least one exhaust fan 12-1 and a cover 12-2. Referring to FIG. 7, the at least one exhaust fan 12-1 may be located at the front side (on the left in FIG. 7) or the rear side (on the right in FIG. 7) of the dehumidification unit 13, or may be located at both the front side and the rear side of the dehumidification unit 13. During the process of polishing wafers, deionized water (DIW) and slurry splash or flow down from a polishing table and a polishing head to the inner lower portion of the housing 1. The cover 12-2 is mounted to the front end of the air exhaust unit 12 in order to prevent deionized water and slurry from moving directly to the exhaust fan 12-1. The cover 12-2 is formed so as to extend at a predetermined incline angle in a downward direction from the upper portion of the front end of the air exhaust unit 12. The contaminated air in the housing 1, i.e. the air containing polishing dust, is discharged to the outside of the housing 1 through the exhaust fan 12-1. The air discharged in this way is changed to air containing moisture due to deionized water and slurry at a temperature of about 30° C. The dehumidification unit 13 dehumidifies the air containing moisture.

The dehumidification unit 13 includes an evaporator 13-1, a compressor 13-2, and a condenser 13-3, and liquefies gas using a cooling device at a temperature of about 3° C. Since the operation and the dehumidification process of the components of the dehumidification unit 13 are the same as those of components of a well-known cooling system, a detailed description thereof will be omitted. The temperature of the air, dehumidified by the dehumidification unit 13, is adjusted to a predetermined temperature by the temperature adjustment unit 14.

The temperature adjustment unit 14 includes a frame 14-1 and dry coils 14-2. The frame 14-1 is supported by the inner surface of the duct 11 in the state of being in contact therewith, and the dry coils 14-2 are provided inside the frame 14-1. The dry coils 14-2 are formed inside the frame 14-1 so as to be spaced apart from each other at regular intervals so that the dehumidified air passes through the spaces therebetween. The temperature of the air is adjusted to a set temperature by the dry coils 14-2. Here, the set temperature may be, for example, 25° C., which is similar to the temperature in the housing 1. The dry coils 14-2 may be formed so as to allow cooling water to flow therethrough. The dry coils 14-2 may employ any of various well-known structures, so long as the same is capable of adjusting the temperature of the air to the set temperature. While the air passes through the spaces between the dry coils 14-2, the temperature of the air is adjusted to the set temperature by the dry coils 14-2.

Referring to FIG. 6, the air, the temperature of which has been adjusted to the set temperature by the temperature adjustment unit 14, moves in a vertically upward direction along the duct 11. The filter unit 15 is mounted in the duct 11, which is formed in the vertical direction.

The filter unit 15 serves to remove polishing dust from the air, the temperature of which has been adjusted to the set temperature by the temperature adjustment unit 14, and includes at least one filter and a dust collector 15-3.

The filter may include a primary filter 15-1 and a secondary filter 15-2. The primary filter 15-1 and the secondary filter 15-2 are mounted in the duct 11 in the state of being spaced a predetermined distance apart from each other. Although not shown in detail, the primary filter 15-1 and the secondary filter 15-2 are preferably configured so as to be detachable. In other words, the primary filter 15-1 and the secondary filter 15-2 are detachably mounted in the duct 11 so as to be replaced with new ones when the degree of contamination thereof exceeds a predetermined level. The filter may remove particles such as polishing dust from the air. In the embodiment, the primary filter 15-1 may be implemented as a filter having a size of 1.0 μm in order to remove relatively large particles, and the secondary filter 15-2 may be implemented as a filter having a size of 0.3 μm in order to remove relatively small particles.

The polishing dust that does not pass through the primary filter 15-1 falls down due to the weight thereof, and is collected in the dust collector 15-3, which is provided under the duct 11. Although not shown in detail, the dust collector 15-3 is formed in a drawer-type structure. When a predetermined amount or more of polishing dust is collected in the dust collector 15-3, the dust collector 15-3 is separated from the duct 11 to discard the collected polishing dust. Also, although not shown, the dust collector 15-3 may be provided with a sensor in order to detect the amount of polishing dust collected therein. In the case in which a sensor is provided, the sensor may be configured to raise an alarm when a predetermined amount or more of polishing dust is collected in the dust collector 15-3. The clean air filtered by the filter unit 15 is introduced again into the housing 1 through the air supply unit 16.

The air supply unit 16 may include at least one supply fan 16-1 and a tertiary filter 16-2. The air supply unit 16 is mounted to the rear end portion of the duct 11, through which the filtered air moves, above the housing 1.

The at least one supply fan 16-1 is disposed above the housing 1, and supplies the air, from which polishing dust has been removed by the filter unit 15, to the inner lower portion of the housing 1 from the upper portion of the housing. In order to further remove particles that were not removed by the secondary filter 15-2, the air supplied from the supply fan 16-1 passes through the tertiary filter 16-2 before entering the housing 1. The tertiary filter 16-2 may be implemented as at least one high-efficiency particulate air (HEPA) filter. In order to again remove particles, which were not removed by the secondary filter 15-2, the tertiary filter 16-2 may be implemented as a filter having a size of 0.3 μm, which is the same as the size of the secondary filter 15-2. Alternatively, the tertiary filter 16-2 may be formed to have a smaller size than the secondary filter in order to remove smaller particles.

Meanwhile, although not shown, the air exhaust unit 12, the dehumidification unit 13, the temperature adjustment unit 14, the filter unit 15, and the air supply unit 16 may be connected to a controller (not shown) so as to be operated under the control of the controller. In addition, the abnormal operation and replacement time of each of the above components may be checked using a separate monitoring unit (not shown).

As described above, the final polishing apparatus FP including the air purification units having the above-described characteristics is capable of smoothly circulating air in the equipment, thereby preventing stagnation of airflow in the equipment. In addition, since the air purification units operate independently, it is possible to solve a problem of low exhaust pressure in the conventional art and to prevent the occurrence of disturbance of airflow in the equipment due to external factors. Furthermore, since polishing dust is removed from the air that is circulated and introduced again into the equipment, it is possible to minimize or prevent localized light-scattering (LLS) defects attributable to polishing dust.

As is apparent from the above description, an air circulation system and a final polishing apparatus including the same according to the present invention have the following effects.

First, air purification units having an air circulation structure are provided at a load unit, an unload unit, and polishing units in order to secure smooth circulation of air in equipment, thereby preventing stagnation of airflow.

In addition, since the air purification units operate independently, it is possible to prevent a reduction in exhaust pressure and to prevent the occurrence of disturbance of airflow in the equipment due to external factors.

In addition, when air is circulated and introduced again into the equipment, polishing dust contained in the circulated air is removed therefrom, whereby localized light-scattering (LLS) defects attributable to polishing dust may be minimized or prevented.

However, the effects achievable through the present invention are not limited to the above-mentioned effects, and other effects not mentioned herein will be clearly understood by those skilled in the art from the above description.

The features, structures, and effects described in association with the embodiments above are incorporated into at least one embodiment of the present invention, but are not limited only to the one embodiment. Furthermore, the features, structures, and effects exemplified in association with respective embodiments can be implemented in other embodiments by combination or modification by those skilled in the art. Therefore, content related to such combinations and modifications should be construed as falling within the scope of the present invention.

What is claimed is:

1. An air circulation system used to improve a degree of contamination in a final polishing apparatus comprising a housing formed to accommodate a load unit, an unload unit, and a plurality of polishing units, the air circulation system comprising:
    air purification units mounted at positions corresponding to positions of the load unit, the unload unit, and the plurality of polishing units the air purification units being configured to discharge contaminated air in the housing to an outside of the housing, to purify the contaminated air, and to supply purified air again into the housing,
    wherein each of the air purification units discharges and supplies air through a duct extending from a lower portion of a side surface of the housing to an upper portion of the housing, and comprises:
    an air exhaust configured to discharge the air in the housing to the outside of the housing;
    a dehumidifier disposed at a front side of the air exhaust, the dehumidifier being configured to remove moisture contained in the air discharged from the housing;
    a temperature adjuster configured to adjust a temperature of the air dehumidified by the dehumidifier to a set temperature;
    a filter system configured to remove polishing dust from the air, the temperature of the air having been adjusted to the set temperature by the temperature adjuster; and
    an air supply configured to supply the air filtered by the filter system into the housing.

2. The air circulation system according to claim 1, wherein the air purification units operate independently.

3. The air circulation system according to claim 1, wherein the air exhaust is mounted at a front side of the duct formed to allow the air to move therethrough, and comprises:
    at least one exhaust fan; and
    a cover configured to prevent slurry, generated during a polishing process, from moving directly to the at least one exhaust fan.

4. The air circulation system according to claim 3, wherein the dehumidifier is mounted at a front side of the at least one exhaust fan, and comprises an evaporator, a compressor, and a condenser.

5. The air circulation system according to claim 1, wherein the temperature adjuster comprises:
    a frame supported by an inner surface of the duct in a state of being in contact with the inner surface of the duct; and
    dry coils provided inside the frame so as to be spaced apart from each other at regular intervals to allow the dehumidified air to pass through spaces therebetween, the dry coils being formed such that the temperature thereof is adjusted to the set temperature.

6. The air circulation system according to claim 1, wherein the filter system comprises at least one filter mounted in the duct in a moving direction of dried air.

7. The air circulation system according to claim 1, wherein the filter system comprises:
    at least one filter detachably mounted in the duct, formed in a vertical direction, in a moving direction of dried air; and
    a dust collector provided under the duct in which the at least one filter is mounted, the dust collector being configured to collect polishing dust removed by the at least one filter.

8. The air circulation system according to claim 1, wherein the air supply unit is mounted at a rear side of the duct formed to allow air to move therethrough, and comprises at least one supply fan configured to supply air containing no polishing dust to an inner lower portion of the housing from the upper portion of the housing.

9. The air circulation system according to claim 8, wherein the air supply further comprises at least one filter disposed at a front side of the at least one supply fan to again filter air to be supplied into the housing.

10. A final polishing apparatus comprising the air circulation system described in claim 1.

* * * * *